(12) United States Patent
Kibblewhite et al.

(10) Patent No.: US 8,037,772 B2
(45) Date of Patent: Oct. 18, 2011

(54) THREAD FORMING FASTENERS FOR ULTRASONIC LOAD MEASUREMENT AND CONTROL

(75) Inventors: Ian E. Kibblewhite, Wayne, PA (US); Robert Molsbergen, Lafayette Hill, PA (US)

(73) Assignee: Innovation Plus, LLC, King of Prussia, PA (US)

( * ) Notice: Subject to any disclaimer, the term of this patent is extended or adjusted under 35 U.S.C. 154(b) by 0 days.

(21) Appl. No.: 10/528,515

(22) PCT Filed: Sep. 19, 2003

(86) PCT No.: PCT/US03/29302
§ 371 (c)(1),
(2), (4) Date: Oct. 26, 2005

(87) PCT Pub. No.: WO2004/027271
PCT Pub. Date: Apr. 1, 2004

(65) Prior Publication Data
US 2006/0144157 A1    Jul. 6, 2006

Related U.S. Application Data

(60) Provisional application No. 60/412,125, filed on Sep. 19, 2002.

(51) Int. Cl.
*F16B 31/02* (2006.01)
(52) U.S. Cl. .................................................. 73/761
(58) Field of Classification Search ............ 411/14, 411/12, 386; 73/716, 761
See application file for complete search history.

(56) References Cited

U.S. PATENT DOCUMENTS

| | | | |
|---|---|---|---|
| 1,909,476 | A | 5/1933 | Trotter |
| 2,413,797 | A | 1/1947 | Stone |
| 3,181,672 | A | 5/1965 | Swanson |
| 3,774,479 | A | 11/1973 | Lesner |
| 3,969,810 | A | 7/1976 | Pagano |
| 3,969,960 | A | 7/1976 | Pagano |
| 4,006,784 | A | 2/1977 | Dudek |
| 4,008,772 | A | 2/1977 | Boys |

(Continued)

FOREIGN PATENT DOCUMENTS
DE    3327964    2/1985
(Continued)

OTHER PUBLICATIONS

Adams, Russ; "2-Dimensional Bar Code"; [online] Feb. 29, 2000; [accessed] Apr. 25, 2007 http://web.archive.org/web/20000229163608/http://www.adams1.com/pub/russadam/stack.html.*

(Continued)

*Primary Examiner* — Lisa Caputo
*Assistant Examiner* — Jonathan Dunlap
(74) *Attorney, Agent, or Firm* — Gary M. Cohen

(57) ABSTRACT

An ultrasonic load measurement transducer (14) is mated with a thread-forming fastener (12) to provide a load indicating thread-forming fastener (10) that can be used for precise and reliable assembly of critical bolted joints, such as those in the automobile and aerospace industries, among others. Steps can then be taken to accurately measure and control the load in the thread-forming fastener (10) during tightening, and to inspect the load in the thread-forming fastener (10) after assembly. A similar result can be achieved for a thread-locking fastener by mating an ultrasonic transducer with the thread-locking fastener assembly.

33 Claims, 3 Drawing Sheets

U.S. PATENT DOCUMENTS

| | | | |
|---|---|---|---|
| 4,043,222 A | 8/1977 | Dudek | |
| 4,074,772 A | 2/1978 | Jonsson | |
| 4,104,778 A | 8/1978 | Vliet | |
| 4,281,538 A | 8/1981 | Dudek | |
| 4,281,987 A | 8/1981 | Kleesattel | |
| 4,294,122 A | 10/1981 | Couchman | |
| 4,295,377 A | 10/1981 | Couchman | |
| 4,305,471 A | 12/1981 | Eshghy | |
| 4,316,512 A | 2/1982 | Kibblewhite et al. | |
| 4,333,351 A | 6/1982 | Bickford | |
| 4,344,138 A | 8/1982 | Frasier | |
| 4,471,657 A | 9/1984 | Voris et al. | |
| 4,569,229 A | 2/1986 | de Halleux | |
| 4,602,511 A | 7/1986 | Holt | |
| 4,649,753 A | 3/1987 | Goodsmith | |
| 4,846,001 A * | 7/1989 | Kibblewhite | 73/761 |
| 4,899,591 A | 2/1990 | Kibblewhite | |
| 4,977,898 A | 12/1990 | Schwarzschild et al. | |
| 5,018,988 A | 5/1991 | Kibblewhite et al. | |
| 5,029,480 A | 7/1991 | Kibblewhite | |
| 5,042,015 A | 8/1991 | Stringer | |
| 5,092,175 A | 3/1992 | Winckler et al. | |
| 5,131,276 A * | 7/1992 | Kibblewhite | 73/761 |
| 5,150,714 A | 9/1992 | Green | |
| 5,165,831 A | 11/1992 | Yager et al. | |
| 5,170,277 A | 12/1992 | Bard et al. | |
| 5,211,061 A | 5/1993 | Goodwin | |
| 5,216,622 A | 6/1993 | Kibblewhite et al. | |
| 5,220,839 A | 6/1993 | Kibblewhite | |
| 5,242,253 A * | 9/1993 | Fulmer | 411/386 |
| 5,291,789 A | 3/1994 | Walton | |
| 5,303,585 A | 4/1994 | Lichte | |
| 5,343,785 A | 9/1994 | Holt et al. | |
| 5,366,026 A | 11/1994 | Maruyama et al. | |
| 5,437,525 A * | 8/1995 | Bras | 411/14 |
| 5,439,063 A | 8/1995 | Anders et al. | |
| 5,726,349 A | 3/1998 | Palmertree et al. | |
| 5,807,048 A * | 9/1998 | d'Agraives et al. | 411/2 |
| 5,970,798 A | 10/1999 | Gleman et al. | |
| 6,009,380 A | 12/1999 | Vecchio et al. | |
| 6,053,906 A | 4/2000 | Honda et al. | |
| 6,078,874 A | 6/2000 | Piety et al. | |
| 6,103,072 A | 8/2000 | Nishiwaki et al. | |
| 6,142,023 A | 11/2000 | Cole et al. | |
| 6,167,758 B1 | 1/2001 | Fomitchev | |
| 6,186,010 B1 | 2/2001 | Eguchi et al. | |
| 6,239,737 B1 | 5/2001 | Black | |
| 6,268,796 B1 | 7/2001 | Gnadinger et al. | |
| 6,338,716 B1 | 1/2002 | Hossack et al. | |
| 6,340,868 B1 | 1/2002 | Lys et al. | |
| 6,341,271 B1 | 1/2002 | Salvo et al. | |
| 6,502,463 B1 | 1/2003 | Clark et al. | |
| 6,598,900 B2 | 7/2003 | Stanley et al. | |
| 6,633,821 B2 | 10/2003 | Jackson et al. | |
| 6,671,185 B2 * | 12/2003 | Duval | 361/807 |
| 6,712,570 B2 | 3/2004 | Kersten | |
| 6,726,960 B1 * | 4/2004 | Sanduja et al. | 427/388.2 |
| 6,843,628 B1 * | 1/2005 | Hoffmeister et al. | 411/14 |
| 6,990,866 B2 | 1/2006 | Kibblewhite | |
| 7,614,303 B2 | 11/2009 | McInerney et al. | |
| 7,644,627 B2 | 1/2010 | Kibblewhite et al. | |
| 7,650,792 B2 | 1/2010 | Kibblewhite | |
| 7,823,458 B2 | 11/2010 | Kibblewhite et al. | |
| 2001/0014262 A1 | 8/2001 | Friederich et al. | |
| 2002/0044063 A1 | 4/2002 | Blagin et al. | |
| 2003/0173098 A1 | 9/2003 | Miner et al. | |
| 2004/0045729 A1 | 3/2004 | Lehnert et al. | |
| 2004/0050567 A1 | 3/2004 | Tambini | |
| 2004/0065154 A1 | 4/2004 | Kibblewhite | |
| 2005/0161241 A1 | 7/2005 | Frauhammer et al. | |
| 2006/0004290 A1 | 1/2006 | Smith et al. | |
| 2006/0102367 A1 | 5/2006 | Etter et al. | |
| 2006/0157262 A1 | 7/2006 | Chen | |
| 2007/0151740 A1 | 7/2007 | Friberg et al. | |
| 2009/0038402 A1 | 2/2009 | Kibblewhite et al. | |
| 2009/0055028 A1 | 2/2009 | Kibblewhite et al. | |
| 2009/0188536 A1 | 7/2009 | Ho | |

FOREIGN PATENT DOCUMENTS

| | | |
|---|---|---|
| DE | 19917222 | 11/2000 |
| EP | 0535919 | 4/1993 |
| EP | 0 541 476 | 5/1993 |
| JP | 04-166732 A | 6/1992 |
| JP | 10-086074 | 4/1998 |
| JP | 02-002239939 A | 8/2002 |
| WO | WO 63565 A1 * | 10/2000 |
| WO | WO 02/061292 | 8/2002 |
| WO | WO 02/061292 | 8/2003 |
| WO | WO 2004/027271 | 4/2004 |
| WO | WO2005063448 | 7/2005 |
| WO | WO 2007/139834 | 12/2007 |

OTHER PUBLICATIONS

"Insuring Your Products' Future Through Chemical Grafting", Polymer Research Corporation of America, Brooklyn, NY.

"TAPTITE 2000® Thread Rolling Fasteners" Catalog, REMINC Research Engineering & Manufacturing Inc., Middletown, Rhode Island (2001).

* cited by examiner

THREAD FORMING FASTENERS FOR ULTRASONIC LOAD MEASUREMENT AND CONTROL

CROSS-REFERENCE TO RELATED APPLICATIONS

This application claims the benefit of U.S. Provisional Application No. 60/412,125, filed Sep. 19, 2002. This application is also a continuation-in-part of U.S. patent application Ser. No. 10/470,372, which has an assigned filing date of Jul. 25, 2003, which was the National Stage of International Application No. PCT/US02/03920, filed Jan. 28, 2002, and which claims the benefit of U.S. Provisional Application No. 60/264,877, filed Jan. 29, 2001.

BACKGROUND OF THE INVENTION

This invention relates to load indicating fasteners that are "thread-forming" (also referred to as "thread-rolling" or "self-tapping" fasteners), methods for making load indicating thread-forming fasteners, and methods for measuring the load in thread-forming fasteners.

Thread-forming fasteners are well known in many industries, such as in high-volume automotive assembly. Examples of such fasteners are described in U.S. Pat. No. 5,242,253 (Fulmer), issued Sep. 7, 1993, for example. Such fasteners are also marketed commercially, for example, by Reminc, Research Engineering and Manufacturing Inc., Middletown, R.I., USA, under the trademark "Taptite" and "Taptite 2000", and a description of such fasteners can be found in their product literature, entitled "Taptite 2000 Thread Rolling Fasteners".

The major advantage of thread-forming fasteners is that they can be installed directly into a drilled hole, eliminating the cost of tapping the hole. Additionally, the thread formed by a thread-forming fastener has very tight tolerance since it is formed by the fastener itself and therefore forms a better nut.

Although thread-forming fasteners have been used in numerous applications in the automotive and aerospace industries to reduce cost, such fasteners are generally restricted to non-critical or less-critical applications. The difficulty in controlling the tightening process prevents their use in critical applications.

The primary reason for this is that the thread-forming process requires torque, in addition to the tightening torque, and this thread-forming torque varies significantly with hole tolerance, material, friction conditions, etc. As a result, the precise tightening of a thread-forming fastener to a specified torque into a blind hole, where the thread is still being formed as the bolt is being tightened, will result in a 3 sigma load scatter of typically +/−50%, which is unacceptable in critical applications.

SUMMARY OF THE INVENTION

For some time, ultrasonics has been used to accurately measure the load in bolts. Initially, removable ultrasonic devices were the most commonly used. More recently, low-cost permanent ultrasonic transducers, which can be permanently attached to one end of the fastener, have come to be used. Permanent fasteners of this type are described, for example, in U.S. Pat. No. 4,846,001 (Kibblewhite), issued Jul. 11, 1989, U.S. Pat. No. 5,131,276 (Kibblewhite), issued Jul. 21, 1992, U.S. Provisional Patent Application No. 60/264,877 (Kibblewhite), filed Jan. 29, 2001, and International Application No. PCT/US02/03920 (Kibblewhite), filed May 17, 2002, the subject matter of which is incorporated by reference herein.

In accordance with the present invention, it has been determined that such ultrasonics can be mated with an otherwise conventional thread-forming fastener to provide a load indicating thread-forming fastener that can be used for precise and reliable assembly of critical bolted joints, such as those in automobile engines (e.g., cylinder heads, connecting rods, main bearings, etc.), drive trains, steering, brakes, suspensions, and a variety of other applications, including aerospace applications.

Steps can then be taken, using equipment and methods that are otherwise known and conventional, to accurately measure and control the load in the thread-forming fastener during tightening, and to inspect the load in the thread-forming fastener after assembly.

For further detail regarding preferred embodiments for implementing the improvements of the present invention, reference is made to the description which is provided below, together with the following illustrations.

DETAILED DESCRIPTION OF THE INVENTION

Figure 1:
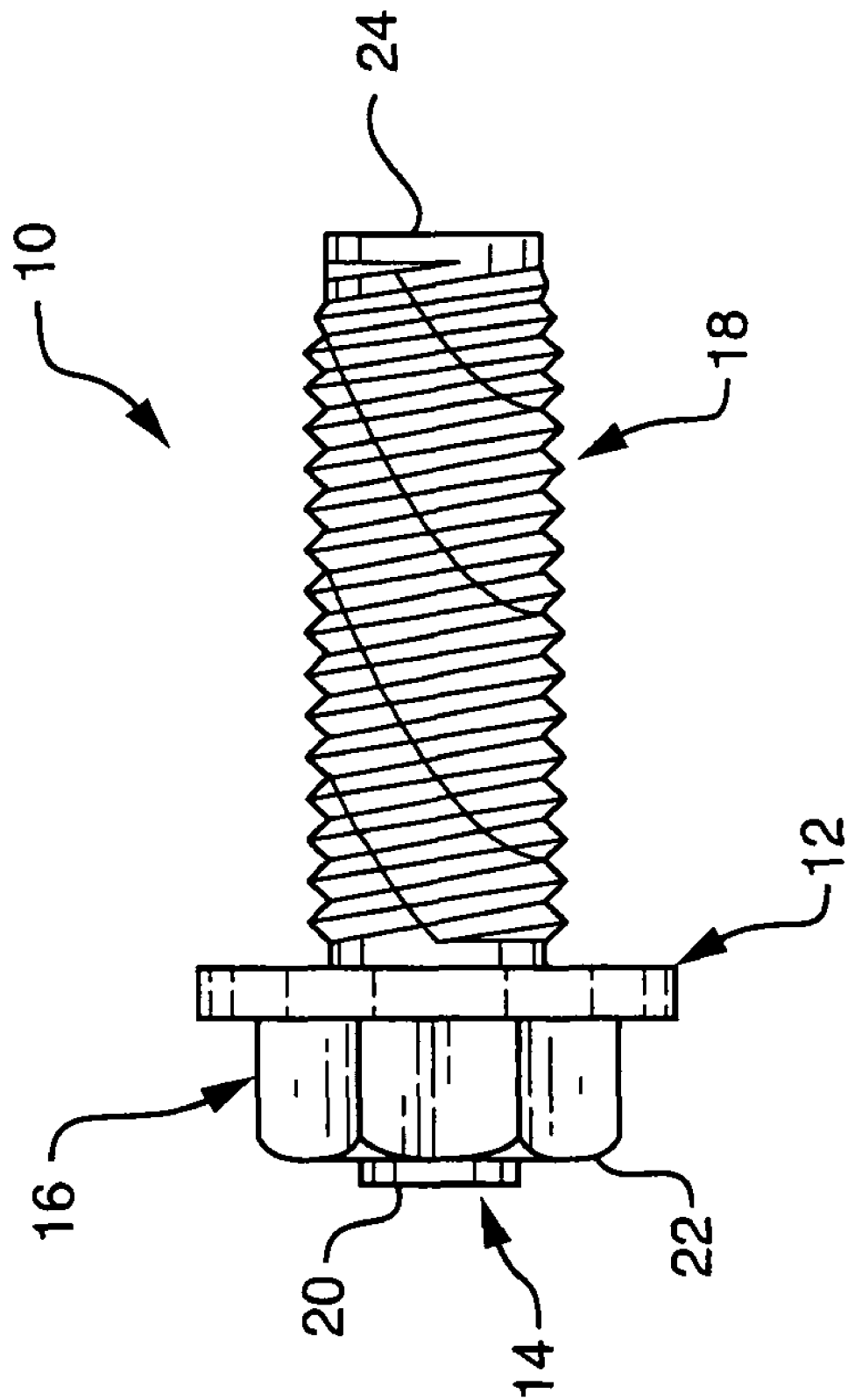
FIG. 1 shows an example of a typical load indicating thread-forming fastener which is produced in accordance with the present invention.

FIG. 1 shows a typical embodiment of a load indicating thread-forming fastener which is produced in accordance with the present invention. In this illustrative example, the load indicating thread-forming fastener has been implemented in conjunction with an otherwise conventional "Taptite" fastener, which is commercially available from Reminc, Research Engineering and Manufacturing Inc., Middletown, R.I., USA. It is to be understood, however, that this embodiment is shown only for purposes of illustration, and that the load indicating thread-forming fastener of the present invention can also be implemented using any of a variety of known and available load indicating devices, coupled or combined with any of a variety of known and available thread-forming fasteners.

In the illustrative embodiment of FIG. 1, the load indicating thread-forming fastener 10 generally includes a fastener 12 (e.g., the above-mentioned "Taptite" fastener) and a permanent piezoelectric polymer film transducer 14 (e.g., of the type disclosed in the above-mentioned U.S. Pat. No. 4,846,001, issued to Kibblewhite) attached to one end. The fastener 12 includes a head 16, which can be suitably engaged by a tool (not shown) for applying torque to the fastener 12, and a thread-forming body portion 18. As disclosed in U.S. Provisional Patent Application No. 60/264,877 (Kibblewhite) and International Application No. PCT/US02/03920 (Kibblewhite), the transducer 14 can further include a two-dimensional high-density bar code (not shown) applied to the top electrode 20 of the transducer 14, for purposes of facilitating the subsequent steps taken to obtain an indication of tensile load, stress, elongation or other characteristic of the fastener 12 during a tightening operation, or at various other times during the service life of the fastener 12, as will be discussed more fully below.

As an example, the transducer 14 can be implemented using a thin piezoelectric polymer sensor (e.g., a 9 micron thick, polyvinylidene fluoride copolymer film, of the type manufactured by Measurement Specialties Inc., Valley Forge, Pa.) permanently, mechanically and acoustically attached to an end surface 22 of the fastener 12. The top electrode of the transducer 14 can be implemented as a thin metallic foil (e.g., an approximately 50 micron thick, type 316, full-hard, dull or matte finished stainless steel) which has been treated to provide a black oxide finish, which is then preferably provided with a black oxide treatment to provide an extremely thin, durable, corrosion resistant and electrically conductive, black coating. A high-resolution bar code can then be marked on this surface by removing selected areas of the coating (e.g., by conventional laser ablation techniques) to provide a high contrast mark easily read with conventional, commercially available optical readers.

It is again to be understood that such implementations are described only for purposes of illustration, and that any of a variety of transducer configurations can be used to implement the transducer 14 applied to the fastener 12, as desired. For example, the ultrasonic transducer 14 can be implemented as an oriented piezoelectric thin film, vapor deposited directly on the head of the fastener 12, as is described in U.S. Pat. No. 5,131,276 (Kibblewhite), issued Jul. 21, 1992. As a further alternative, the ultrasonic transducer 14 can be implemented as a piezoelectric polymer film, chemically grafted on the head of the fastener 12, as is described in U.S. Provisional Patent Application No. 60/264,877 (Kibblewhite), filed Jan. 29, 2001, and International Application No. PCT/US02/03920 (Kibblewhite), filed May 17, 2002. It will be readily understood that other alternative implementations are also possible.

In the embodiment illustrated in FIG. 1, the ultrasonic transducer 14 is permanently attached to the head 16 of the fastener 12, as described in the above-referenced patents issued to Kibblewhite. An essentially flat, or spherically radiused surface 24 is provided on at least a portion of the threaded end of the fastener to provide an acoustically reflective surface to reflect the ultrasonic wave transmitted by the transducer back to the transducer. Load is then measured using standard, pulse-echo ultrasonic techniques, which are themselves known in the art and described, for example, in the above-referenced patents issued to Kibblewhite. Load control accuracies of +/−3% have been achieved when tightening thread-forming fasteners into blind holes during both the first and subsequent tightenings.

In an alternative embodiment, an essentially flat surface is provided on the head 16 of the thread-forming fastener 12 and a removable ultrasonic transducer is temporarily attached to the fastener for the purpose of making load measurements. The threaded end of the fastener 12 is identical to the previous embodiment with the permanent ultrasonic transducer.

In practice, heat is generated as a result of the thread-forming work that takes place during the thread-forming run-down stage of the installation of a thread-forming fastener. This results in a slight increase in temperature in both the fastener (the bolt) and the resulting joint. This increase in temperature can cause errors in the ultrasonic load measurements to be taken because of thermal expansion effects. For this reason, when using ultrasonics for inspecting the load in a fastener, it is usual to measure the temperature of the fastener or the joint in order to compensate for the effects of thermal expansion.

However, in conjunction with a thread-forming fastener, the average temperature increase due to the heat generated during thread-formation can not be measured directly during the installation process and is subject to variations in material, friction, and heat conduction properties of the joint components. Without compensation, this thermal effect can result in inaccuracies of load measurement on the order of 5% to 20%, depending on the bolt, the joint and the assembly process being used.

Figure 2:
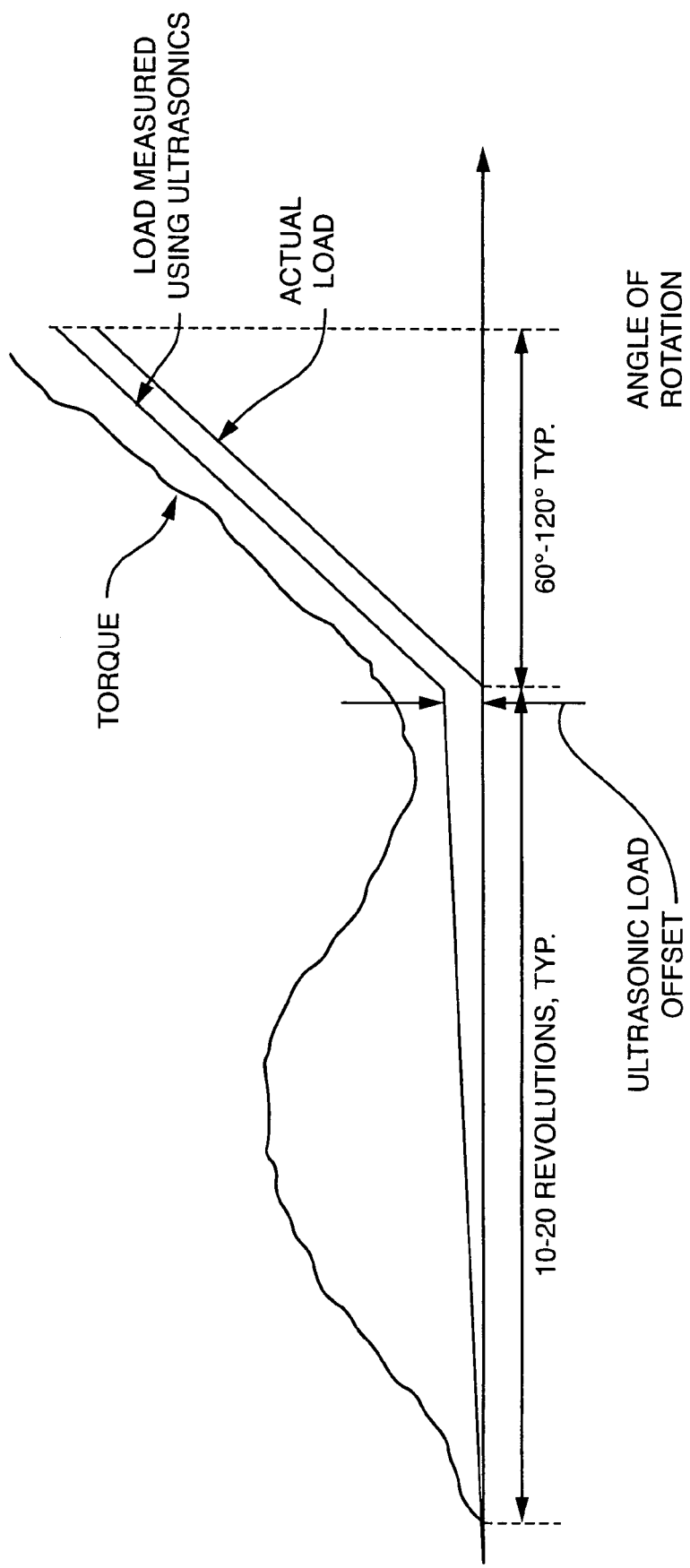
FIGS. 2 and 3 are graphs showing typical load and torque characteristics plotted against the angle of rotation of the load indicating thread-forming fastener of the present invention.
Figure 3:
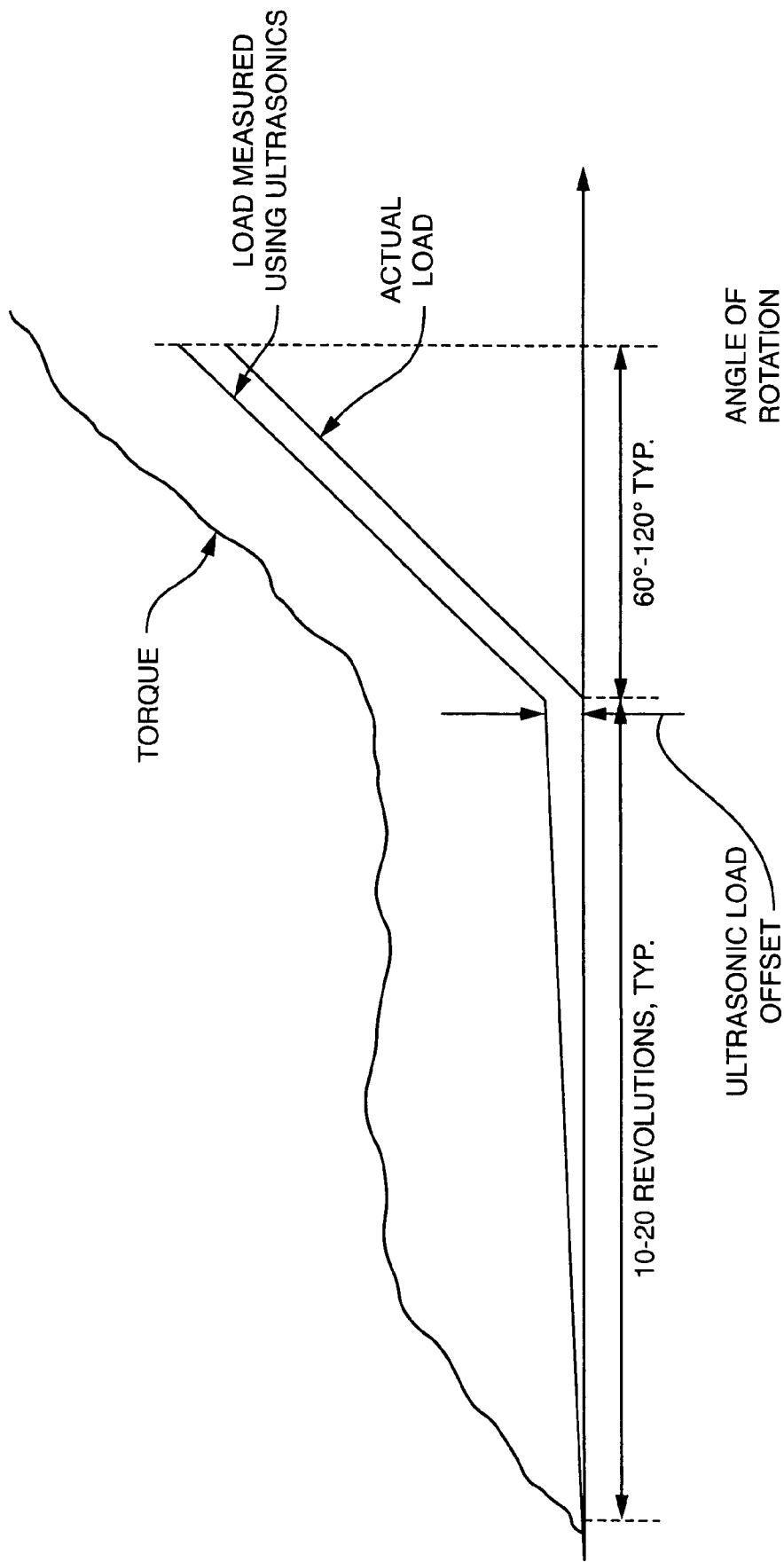

FIGS. 2 and 3 show typical load and torque characteristics plotted against the angle of rotation of a typical bolt. FIG. 2 shows the tightening curves for a typical through-hole application, in which the torque reduces after the thread is formed through the entire hole. FIG. 3 shows the tightening curves for a typical blind hole application, in which the thread is still being formed as the bolt is tightened.

Further in accordance with the present invention, more accurate load measurements in the thread-forming load indicating fasteners are provided by eliminating the effects of fastener heating resulting from the thread-forming process. This is achieved by measuring the load (or acoustic time-of-flight) value immediately prior to the load-inducing stage of the assembly process, and by using this measured value as the zero-load reading.

The load-inducing stage of the assembly process can be detected by any one of a variety of methods. For example, an increase in load above a predetermined threshold, a change in the increase in load with time, angle of rotation of the fastener or torque, an increase in torque above a predetermined threshold, or a change in the increase in torque with time, angle or load can be detected. Irrespective of the method used to detect the load-inducing stage of the assembly process, a new zero-load base measurement is taken as a value just prior to the load-inducing assembly stage by selecting or calculating a load measurement prior to the load-inducing stage. This can be achieved by selecting a load measurement corresponding to a fixed time or angle prior to the detection of the commencement of the load-inducing stage, for example. Alternatively, for through-hole applications, the end of the thread-forming phase can be detected by a reduction in torque. It is again to be understood that such methods are only illustrative, and that there are numerous other methods for determining the new zero-load base measurement prior to tightening, from load, time, torque and angle of rotation measurements recorded during assembly operations with hand and powered assembly tools.

The thermal effect of thread forming causes an apparent positive load value at zero load just prior to tightening. An alternative to zeroing the load (or time-of-flight measurement) is to add this load offset, measured prior to the load-inducing stage of the assembly process, to the target load (or target time-of-flight). The result is the same since the increase in measured load is the same.

Yet another alternative is to experimentally determine an average value of load error due to the thread forming and adjust the zero-load measurement or target tightening parameter to compensate for this effect using one of the above-described methods. This approach, however, does not compensate for variations with individual fasteners or joint components and is therefore presently considered less desirable.

The result is that, for the first time, ultrasonic load measurement technology can be used with thread-forming fasteners. Errors in load measurement resulting from the thermal effects of thread-forming can be compensated. This then results in accurate load measurement and tightening control of the thread-forming fasteners.

The above-described method of eliminating the effects of fastener heating resulting from the thread-forming process can also be used with other fastener assembly processes that generate heat prior to the load-inducing tightening stage. Thread-locking bolts and nuts, for example, are manufactured with a prevailing "locking" torque to prevent the fastener from loosening during service. Most often, the thread of either the bolt or nut has an irregular profile causing the threads to elastically deform slightly upon mating. Alternatively, the bolt or nut has an insert or patch of a soft material to provide the prevailing torque or resistance to loosening. The prevailing torque provided by these thread-locking features produces heating of the fastener during rundown in the same manner as the tapping torque does with a thread-forming fastener. Consequently, the above-described method for compensating for thermal-related errors in accordance with the present invention can be used with prevailing torque-locking fasteners to improve the accuracy of ultrasonic load measurement during assembly.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An apparatus for precisely and reliably assembling a critical joint, in combination with a load measurement apparatus for making ultrasonic load measurements in a fastener, comprising:
   a thread-forming fastener including a head for engagement by a tool for appying a torque to the fastener, and a body portion extending from the head and including thread-forming portions; and
   an ultrasonic transducer coupled with the thread-forming fastener, for making precise and reliable ultrasonic load measurements in the thread-forming fastener;
   wherein the load measurement apparatus is electrically connected to the ultrasonic transducer to supply signals to the ultrasonic transducer and to receive signals from the ultrasonic transducer, and includes a monitor receiving signals from the ultrasonic transducer to provide an accurate measurement indicative of the load in the thread-forming fastener, and a compensator adjusting the measurement indicative of the load to compensate for effects of heating of the thread-forming fastener resulting from forming a thread in a mating component during installation.

2. The apparatus of claim 1 wherein the ultrasonic transducer is coupled with the head of the thread-forming fastener.

3. The apparatus of claim 1 wherein the ultrasonic transducer is permanently attached to the thread-forming fastener.

4. The apparatus of claim 3 wherein the ultrasonic transducer is comprised of a piezoelectric polymer film permanently attached to the head of the thread-forming fastener.

5. The apparatus of claim 3 wherein the ultrasonic transducer is comprised of an oriented piezoelectric thin film, vapor deposited directly on the head of the thread-forming fastener.

6. The apparatus of claim 3 wherein the ultrasonic transducer is chemically grafted on the head of the thread-forming fastener.

7. The apparatus of claim 1 wherein the ultrasonic transducer is temporarily attached to the thread-forming fastener.

8. The apparatus of claim 1 wherein the ultrasonic transducer further includes an information storage medium applied to the ultrasonic transducer, wherein the information storage medium includes markings corresponding to data associated with the thread-forming fastener.

9. The apparatus of claim 8 wherein the information storage medium is a bar code applied to the ultrasonic transducer.

10. The apparatus of claim 1 wherein the load measurement apparatus is coupled with a tool for engaging the head of the thread-forming fastener, and wherein the tool imparts torque to the thread-forming fastener and removes torque from the thread-forming fastener responsive to the measurement of the load in the thread-forming fastener.

11. The apparatus of claim 1 wherein the load measurement apparatus determines a zero-load ultrasonic measurement in the thread-forming fastener using the measurement indicative of the load in the thread-forming fastener.

12. The apparatus of claim 11 wherein the load measurement apparatus determines the zero-load ultrasonic measurement prior to a load-inducing stage of the installation.

13. The apparatus of claim 11 wherein the load measurement apparatus determines the zero-load ultrasonic measurement during a load-inducing stage of the installation.

14. The apparatus of claim 1 which further includes markings placed on the ultrasonic transducer which correspond to data associated with the thread-forming fastener.

15. The apparatus of claim 14 wherein the markings are a bar code placed on the ultrasonic transducer.

16. A method of measuring a load in a fastener, comprising the steps of:
   providing a thread-forming fastener including a head for engagement by a tool for applying a torque to the fastener, and a body portion extending from the head and including thread-forming portions;
   coupling an ultrasonic transducer with the thread-forming fastener, for making ultrasonic load measurements in the thread-forming fastener;
   electrically connecting an apparatus to the ultrasonic transducer for supplying signals to the ultrasonic transducer and for receiving signals from the ultrasonic transducer;
   monitoring the signals received from the ultrasonic transducer, providing an accurate measurement indicative of the load in the thread-forming fastener; and
   adjusting the measurement indicative of the load to compensate for effects of heating of the thread-forming fastener resulting from forming a thread in a mating component during installation.

17. The method of claim 16 which further includes the step of determining azero-load ultrasonic measurement, using the measurement indicative of the load in the thread-forming fastener.

18. The method of claim 17 which further includes the step of measuring a torque in conjunction with the measurement indicative of the load in the thread-forming fastener to determine the zero-load ultrasonic measurement.

19. The method of claim 17 which further includes the step of measuring an angle of rotation of the thread-forming fastener in conjunction with the measurement indicative of the load in the thread-forming fastener to determine the zero-load ultrasonic measurement.

20. The method of claim 17 which further includes the step of measuring time in conjunction with the measurement indicative of the load in the thread-forming fastener to determine the zero-load ultrasonic measurement.

21. The method of claim 17 which further includes the step of taking measurements for determining the zero-load ultrasonic measurement prior to a load-inducing stage of the installation.

22. The method of claim 17 which further includes the step of taking measurements for determining the zero-load ultrasonic measurement during a load-inducing stage of the installation.

23. The method of claim 16 which further includes the step of placing markings on the ultrasonic transducer corresponding to data associated with the thread-forming fastener.

24. The method of claim 23 which further includes the step of marking a bar code on the ultrasonic transducer.

25. A method of measuring a load in a fastener, comprising the steps of:
provoking a thread-locking fastener assembly for engagement by a tool for applying a torque to the thread-locking fastener assembly, including a bolt having a head and a body portion extending from the head, and a nut for cooperating with the body portion of the bolt, wherein portions of the thread-locking fastener assembly include resistance-inducing threads;
coupling an ultrasonic transducer with the bolt, for making ultrasonic load measurements in the thread-locking fastener assembly;
electrically connecting an apparatus to the ultrasonic transducer for supplying signals to the ultrasonic transducer and for receiving signals from the ultrasonic transducer;
monitoring the signals received from the ultrasonic transducer, providing an accurate measurement indicative of the load in the thread-locking fastener assembly; and
adjusting the measurement indicative of the load to compensate for effects of heating of the thread-locking fastener assembly resulting from prevailing torque associated with the thread-locking fastener assembly.

26. The method of claim 25 which further includes the step of determining a zero-load ultrasonic measurement, using the measurement indicative of the load in the thread-locking fastener assembly.

27. The method of claim 26 which further includes the step of measuring a torque in conjunction with the measurement indicative of the load in the thread-locking fastener assembly to determine the zero-load ultrasonic measurement.

28. The method of claim 26 which further includes the step of measuring an angle of rotation of the fastener in conjunction with the measurement indicative of the load in the thread-locking fastener assembly to determine the zero-load ultrasonic measurement.

29. The method of claim 26 which further includes the step of measuring time in conjunction with the measurement indicative of the load in the thread-locking fastener assembly to determine the zero-load ultrasonic measurement.

30. The method of claim 26 which further includes the step of taking measurements for determining the zero-load ultrasonic measurement prior to inducing the load in the thread-locking fastener assembly.

31. The method of claim 26 which further includes the step of taking measurements for determining the zero-load ultrasonic measurement while inducing the load in the thread-locking fastener assembly.

32. The method of claim 25 which further includes the step of placing markings on the ultrasonic transducer corresponding to data associated with the thread-locking fastener assembly.

33. The method of claim 32 which further includes the step of marking a bar code on the ultrasonic transducer.

* * * * *